United States Patent
Schwalbe et al.

(10) Patent No.: US 10,676,870 B2
(45) Date of Patent: Jun. 9, 2020

(54) WATER BASED WAX DISPERSION COMPRISING A HYDROCARBON WAX AND A DIALKYLETHER FOR COATING PAPER PRODUCTS

(71) Applicant: Sasol Wax GmbH, Hamburg (DE)

(72) Inventors: Andreas Schwalbe, Hamburg (DE); Ulrich Schneider, Heist (DE); Thomas Haas, Winsen/Luhe (DE); Oliver Herzog, Brunsbuttel (DE)

(73) Assignee: Sasol Wax GmbH, Hamburg (DE)

( * ) Notice: Subject to any disclaimer, the term of this patent is extended or adjusted under 35 U.S.C. 154(b) by 137 days.

(21) Appl. No.: 15/552,776

(22) PCT Filed: Mar. 10, 2016

(86) PCT No.: PCT/EP2016/000430
§ 371 (c)(1),
(2) Date: Aug. 22, 2017

(87) PCT Pub. No.: WO2016/142068
PCT Pub. Date: Sep. 15, 2016

(65) Prior Publication Data
US 2018/0030657 A1  Feb. 1, 2018

(30) Foreign Application Priority Data

Mar. 10, 2015 (EP) .................... 15158484

(51) Int. Cl.
| | |
|---|---|
| *D21H 19/12* | (2006.01) |
| *C10M 173/00* | (2006.01) |
| *D21H 19/46* | (2006.01) |
| *C10M 105/18* | (2006.01) |
| *C09D 7/63* | (2018.01) |
| *C09D 191/06* | (2006.01) |
| *D21H 19/72* | (2006.01) |
| *D21H 23/22* | (2006.01) |
| *B41M 7/00* | (2006.01) |
| *B41M 7/02* | (2006.01) |

(52) U.S. Cl.
CPC ............ *D21H 19/12* (2013.01); *C09D 7/63* (2018.01); *C09D 191/06* (2013.01); *C10M 105/18* (2013.01); *C10M 173/00* (2013.01); *D21H 19/46* (2013.01); *D21H 19/72* (2013.01); *D21H 23/22* (2013.01); *B41M 7/0036* (2013.01); *B41M 7/02* (2013.01); *B42P 2241/20* (2013.01); *C10M 2201/08* (2013.01); *C10M 2205/14* (2013.01); *C10M 2205/163* (2013.01); *C10M 2205/17* (2013.01); *C10M 2207/04* (2013.01); *C10M 2207/121* (2013.01); *C10M 2209/104* (2013.01); *C10M 2209/105* (2013.01); *C10M 2215/04* (2013.01); *C10N 2220/023* (2013.01); *C10N 2220/082* (2013.01); *C10N 2230/06* (2013.01); *C10N 2270/02* (2013.01)

(58) Field of Classification Search
None
See application file for complete search history.

(56) References Cited

U.S. PATENT DOCUMENTS

| | | | |
|---|---|---|---|
| 3,985,932 A | 10/1976 | Porter | |
| 4,567,087 A * | 1/1986 | O'Dell | B32B 29/00 156/222 |
| 2008/0241389 A1* | 10/2008 | Mullay | C09D 11/033 427/256 |
| 2011/0033555 A1* | 2/2011 | Kwetkat | B01F 17/0014 424/537 |
| 2011/0287073 A1* | 11/2011 | Strauss | A61K 8/0208 424/401 |
| 2012/0052261 A1* | 3/2012 | Aoyama | B41M 5/0011 428/195.1 |

FOREIGN PATENT DOCUMENTS

| | | |
|---|---|---|
| DE | 4237501 | 5/1994 |
| DE | 19854531 | 5/2000 |
| DE | 10133399 | 1/2003 |
| DE | 102004056786 | 7/2005 |
| DE | 102005005176 | 8/2006 |
| EP | 0635342 | 1/1995 |
| EP | 0930161 | 5/2003 |
| WO | WO 2004/062630 | 7/2004 |
| WO | WO 2010/018017 | 2/2010 |

* cited by examiner

*Primary Examiner* — Chinessa T. Golden
(74) *Attorney, Agent, or Firm* — Bushman Werner, P.C.

(57) ABSTRACT

The present invention relates to water based wax dispersion comprising a hydrocarbon wax and a dialkylether for the coating of paper products, the use thereof, the method of coating paper products therewith and the coated printed paper product.

20 Claims, No Drawings

WATER BASED WAX DISPERSION COMPRISING A HYDROCARBON WAX AND A DIALKYLETHER FOR COATING PAPER PRODUCTS

This application is a national phase application of PCT/EP2016/000430, filed Mar. 10, 2016, which claims priority to EP 15158484.4, filed Mar. 10, 2015, the disclosures of which are incorporated herein by reference for all purposes.

The present invention relates to a water based wax dispersion comprising a hydrocarbon wax and a dialkylether for the coating of paper products, the use thereof, the method of coating paper products therewith and the coated printed paper product.

BACKGROUND

Paper products are coated or varnished after printing to increase slip and to reduce the abrasion and friction. Such treatment results in an over print varnish which helps to reduce any negative impact that may arise to printed paper surfaces from further handling. The treatment is also used to improve the overall gloss of the paper.

Over print varnish compositions are especially applied in the manufacture of brochures, advertisement prints or packages produced with offset printing technology. The purpose of the over print varnish is to protect printed surfaces during processing after the print and upgrade its appearance due to the additional level of gloss.

Over print varnishes used to finish and condition printed papers may be oil- or water-based, and based on UV-crosslinking polymers, lacquers or waxes.

Since the development of water based inks in the 1970-ies water based over print varnishes have increasingly been applied after the printing process in an offset printing press. Water based over print varnishes are still commonly used until present.

U.S. Pat. No. 3,985,932 describes the use of waxes in water based paper coatings. According to the disclosure a paper coating additive can be obtained by using hard waxes, especially Fischer-Tropsch waxes, with a melting point above 80° C. and a particle size less than 50 μm. The waxes are suggested as a substitute for calcium stearate which has been commonly used as lubricating agent, and in order to improve the gloss and the brightness of the printed paper.

Also the installation engineering of offset printing machines developed over the years and was adapted to apply water based inks and over print varnishes. Through the change from two-roll-systems to wipe-off chamber-machines the spreading of the varnish became more homogeneous, the dosage accuracy of the varnish was improved and additional pigments could be applied (e.g. pearlescent or metallic pigments).

EP 0930161 B1 teaches the use of special anilox rolls to spread 10 to 30% silicone-, silicone wax- or wax-emulsions as over print varnish on paper, which provide a homogeneous and sufficient coating of the paper, show no mottling and reduce the formation of wax deposits.

The greatest disadvantages often associated with water based over print varnishes are the low heat-resistance, an inhomogeneous coating due to the oil-repellency of dye residuals on the surface as well as the insufficient adhesion between multiple layers.

Alternative products such as silicone oil-based emulsions are expensive, do not produce a reliable gloss and have a high deposition tendency which can block the applicator roll in the printing press, thereby making time consuming cleaning operations necessary.

It is therefore an aim of the present invention to overcome above insufficiencies and provide a water based wax formulation for surface curing of paper- and print-products with improved properties.

It was surprisingly found that water based wax formulations containing dialkylethers can fulfill these needs.

In the prior art dialkylethers, especially NACOL®-ether of Sasol (Dihexyl (C6), dioctyl (C8) and didecyl (C10)) are mentioned as a release agent, defoaming agent and an additive for a wide range of other applications (DE 102004056786).

DE 4237501A1 describes dialkyethers, in particular a dioctylether, as a replacement of mineral oil in metal surface treatment. The oil phase of the prepared 5% aqueous emulsions contained more than 50 wt.-% dialkylether and other components (for example fatty alcohol ethoxylates). The emulsions are used for anti-corrosion coatings for metals and have a good material compatibility with rubber gaskets.

EP 0635342 A1 discloses release emulsions for separating concrete from a mould using 2 to 3 weight parts of a dialkyether. An exemplary composition consists of 145 parts water, 35 parts palm kernel fatty acid-butylester, 13 parts di-hexylether, 9 parts of lauryl alcohol and 1 part of coconut fatty acid-diethanolamide.

WO 2010018017 A2 describes the use of long chain (C8 to C50) dialkyether in pulverulent material compositions (mortar, putty, glue joints etc.). The ether in the compositions acts as a dust-binder without adversely affecting other properties such as efficacy, stability and strength.

DE 19854531 A1 claims defoamer granules for solid detergents which contain in addition to silicones also dialkylethers (C6 to C22) as defoamers and mentions the advantageous dustbinding properties of dialkylethers and the ability to minimize the disadvantages of silicone coatings like stickiness.

DE 10133399 A1 describes compositions based on wax, which can be used as a basis for cosmetic products, but also for the impregnation and wetting of hygienic cloth paper. In addition to the wax component the formulations contain dialkyether as a constituent of the oil phase and less than 10 wt.-% of water. A preferred embodiment is composed of:
  1-50 wt.-% of at least one dialkylether,
  0.1-5 wt.-% of at least one active substance,
  1-10 wt.-% of at least one oil,
  0.1-10 wt.-% of at least one emulsifier,
  5-90 wt.-% of wax components and
  0-5 wt.-% water.

DE 102005005176 A1 describes water-in-oil emulsions comprising solid dialkylethers and/or dialkycarbonates for cosmetic applications. Oil- and wax-components are mentioned as part of the liquid oil phase, which is the continuous phase of the emulsion. Preferred dialkylethers according to this reference are saturated, linear C12-C22-dialkyethers such as distearylether ($C_{18}H_{37}$—O—$C_{18}H_{37}$). The dialkylethers are used to increase the viscosity of the emulsion.

None of the cited prior art documents describe or suggest the use of dialkylethers in wax emulsions or dispersions to obtain a uniform paper coating.

It is therefore an objective of the present invention to provide a wax dispersion that is smoothly applicable to a paper surface such as by modern offset printing machines and when applied to the printed surface of a paper product results in an uniform paper coating that provides good gloss and protection to the surface.

SUMMARY OF THE INVENTION

It was found that wax dispersions comprising:
a) a dispersed phase comprising:
  at least one hydrocarbon wax and
  at least one dialkylether;
b) a continuous phase comprising more than 50 wt. % of water relative to the total weight of the wax dispersion; and
c) at least one surfactant have advantageous properties in the surface treatment of paper products, in particular printed paper products.

Paper products according to the invention are materials produced in a process comprising bringing together moist fibers, typically cellulose pulp derived from wood, rags or grasses, and drying them into the final shape. Paper products can be used for writing and/or printing upon. Furthermore they are widely used as packaging material and include card boards and corrugated boards.

Amongst others the above wax dispersions show an improved wettability on the paper products, a low foam tendency and reduced deposits on the rolls of the printing machine.

The printed paper product coated with the inventive wax dispersion shows an improved abrasion stability and a higher gloss.

In a preferred embodiment the wax dispersion comprises 50 to 95 wt.-% water, more preferably 65 to 75 wt.-% water relative to the total weight of the wax dispersion.

DETAILED DESCRIPTION OF THE INVENTION

Hydrocarbon waxes according to the present invention are physically defined as compositions preferably having a congealing point of 40° C. or above and typically melt between 50 and 90° C. with exceptional cases up to 200° C. without decomposition.

Hydrocarbon waxes according to the invention are waxes that comprise more than 99% hydrogen and carbon atoms, preferably comprising more than 99.8% hydrogen and carbon atoms and most preferably consisting solely out of hydrogen and carbon atoms.

The hydrocarbon wax may be present in a concentration of 5 to 30 wt.-%, preferably 15 to 20 wt.-% relative to the total weight of the wax dispersion and may be a petroleum based paraffin wax, synthetic Fischer-Tropsch wax or polyolefin wax or mixtures thereof, independent thereof preferably with a congealing point according to DIN ISO 2207 of 40 to 110° C., more preferably 40 to 90° C. and most preferably 50 to 70° C.

The relatively low hydrocarbon wax content of the wax dispersion improves the dilutability thereof with water.

The dispersion may comprise non-ionic or cationic surfactants or both.

The non-ionic surfactant may be present in a concentration of 2 to 10 wt.-%, preferably 6 to 8 wt.-% relative to the total weight of the wax dispersion and is preferably an alcohol ethoxylate or propoxylate or both, more preferably an oxo-alcohol ethoxylate. Independent thereof preferably the alcohol group contains 8 to 24 carbon atoms, more preferably 10 to 18 carbon atoms and the degree of ethoxylation is 2 to 20, more preferably 4 to 12.

The non-ionic surfactant improves the spreadibility of the wax dispersion on the roll and the paper afterwards and decreases the particle size of the emulsion. The low particle size improves a homogeneous, thin coating and allows a further dilution with water before the paper application.

The cationic surfactant may be present in a concentration of 1 to 3 wt.-%, preferably 1.5 to 2 wt.-% relative to the total weight of the wax dispersion and is preferably a protonated N-alkyl-diamine or a quaternary ammonium compound having at least one alkyl group, and more preferably a protonated N-alkyl-propylen-diamin, wherein the alkyl group contains 6 to 24 carbon atoms, preferably 10 to 18.

The cationic surfactant increases the affinity of the wax dispersion to the mostly negative surface charge of the paper fibres, thereby showing good wetting and spreading properties. Further such wax dispersions impose an antistatic effect to the paper surface.

The dialkylethers may be present in a concentration of 1 to 10 wt.-%, preferably 4 to 6 wt.-% relative to the total weight of the wax dispersion and have the following formula $R^1-O-R^2$, wherein $R^1$ and $R^2$ are independently of each other aliphatic, cycloaliphatic or aromatic hydrocarbon residues, preferably linear or branched aliphatic hydrocarbon residues each with 6 to 32 carbon atoms, preferably 6 to 12 carbon atoms.

Preferably $R^1$ is equal to $R^2$ and is selected from the group of hexyl-, octyl- or decyl-residues, more preferably $R^1$ and $R^2$ are octyl-residues.

Without the wish to be bound to this theory it is assumed that the ether migrates to the surface of the water phase and improves the spreadability as well as the affinity of the dispersion on and to the roll and the paper. It acts as a release agent for the wax on the rolls resulting in a homogeneous and stable coating with a high gloss, which can even be increased by polishing the surface. The ether also leads to a distinctly lower wax deposit formation on the rolls by the reduction of printing ink removal.

Conventional silicone or wax emulsions and dispersions do not produce a homogeneous and constant coating of the paper. Next to that they are not polishable and tend to deposit on and block the rolls by carrying inks pigments with them.

The weight ratio of the hydrocarbon wax and the dialkylether may range from 2:1 to 4:1, preferably from 2.8:1 to 3.4:1.

According to a further embodiment the wax dispersion is characterised by an average particle size $d_{90}$ (number average) of the particles and droplets below 300 µm, determined by laser diffraction and/or light scattering. The small particles result in a higher specific surface area and improve the performance and spreading of the wax dispersion in the coating process.

The wax dispersion is preferably further characterised by a surface tension of 30 to 40 $mN·m^{-1}$, more preferably 35 to 36 $mN·m^{-1}$. The surface tension is determined with the plate method according to Wilhelmy. The surface tension in the before mentioned range provides a good distribution of the dispersion on the rolls and the paper.

When a cationic surfactant is applied the wax dispersion has a pH-value of 6 to 9, preferably 7.5 to 8.5, which may be adjusted by adding organic or mineral acids and/or amines, preferably acetic acid and/or dicyclohexylamine.

According to a further embodiment of the invention the wax dispersion is a concentrate and the ready-to-use wax dispersion is obtainable from the concentrate by diluting with water in a ratio of 1 (wax dispersion):1 (water) to 1:5.

According to a further aspect of the invention there is provided a method of coating paper product comprising applying a wax dispersion mentioned above to a surface of a paper product, preferably webs of paper. The wax dispersion may be diluted with water in a ratio of 1:1 to 1:5 prior to coating or alternatively diluting the dispersion until a concentration of the sum of the hydrocarbon wax and the dialkylether of 3.5 to 12 wt.-%, preferably 8 to 11 wt.-% relative to the total weight of the wax dispersion is obtained.

Preferably the paper product surface is a printed paper product surface. The method may optionally comprise a drying or polishing step or both after the coating.

The amount of the sum of the hydrocarbon wax and the dialkylether applied to the paper product may be from 0.2 to 1 g·m$^{-2}$, preferably from 0.4 to 0.9 g·m$^{-2}$.

The invention further related to the use of the wax dispersion as described herein for obtaining a coating on a printed paper product, wherein the printed paper product obtained has an improved abrasion stability or an improved gloss or both.

The invention is further described by the examples without being limited thereto.

EXAMPLES

A wax dispersion A according to the present invention consisting of
- 68.12 wt.-% water
- 16.19 wt.-% hydrocarbon wax (Sasolwax M5 from Sasol Wax GmbH)
- 8.00 wt.-% non-ionic surfactant (Lutensol TO 8 from BASF)
- 5.00 wt.-% dialkylether (NACOL-8-Ether from Sasol Germany GmbH)
- 1.70 wt.-% cationic surfactant (Dinoram 42E from Ceca)
- 0.74 wt.-% 60% acetic acid (from BCD Chemie GmbH)
- 0.25 wt.-% dicyclohexylamine (from Overlack)

was produced and had the following properties
pH-value: 8.1
Surface tension: 36 mN·m$^{-1}$ The surface tension was measured with a Kruess Tensiometer K100 with the plate method according to Wilhelmy.

The wax used for above wax dispersion is a Fischer-Tropsch wax with a congealing point of 58° C. measured according to DIN ISO 2207.

The non-ionic surfactant is a C13-Oxo alcohol ethoxylate with a degree of ethoxylation of 8.

The dialkylether is a di-n-octylether and the cationic surfactant is an N-alkyl-propylen-diamine.

Wax dispersions with non-ionic surfactants typically show heavy foam formation. After bubbling air through 100 ml of the dispersion for 120 seconds in a 1000 ml beaker glass at least 900 ml of foam will form. The wax dispersion according to the invention does not show foam formation in the same test, which results in an improved application in the paper coating process.

The average particle size of the above wax dispersion was $d_{10}$=0.072 μm, $d_{50}$=0.125 μm and $d_{90}$=0.210 μm, from which a calculated specific surface area of 52 m$^2$·ml$^{-1}$, based on the wax concentration and the assumption that the particles are spherical, results. This is much lower than conventional silicone or wax emulsions with $d_{50}$=0.400 μm, from which a specific surface area of only 20 m$^2$·ml$^{-1}$ can be calculated.

The average particle size was measured by laser diffraction and light scattering with an instrument from Beckman Coulter (LS13320) using 5 drops of the dispersion diluted in 30 ml distilled water.

The above wax dispersion was used as over print varnish in an offset printing procedure using LWC130 or SC-paper (80 g·m$^{-2}$) with a high ink-load. The wax dispersion was further diluted 1:2 with water before being applied to the printed paper via the steel turning bar. According to gravimetric reweighing of the coated paper the amount of wax dispersion applied to was 0.4 to 0.9 g·m$^{-2}$.

The abrasion- and grit-stability of the printed paper coated with the above wax dispersion A was determined with a "Quartant Scheuertester" from Pruüfbau. A printed paper sample and a sample of a printed paper coated with the wax dispersion A were scrubbed with a defined number of hubs at norm pressure against an unprinted paper. The number of hubs needed to transfer any colour to the unprinted sample or to destroy the printing of the sample is a degree for the abrasion stability. This was always higher for printed paper coated with the above wax dispersions compared to an uncoated paper.

Another quick possibility to test the abrasion stability is to determine the abrasion with the palm of hand or the thumb. In the lab scale the abrasion stability of the coated paper was tested by rubbing oscillatory and with pressure over a 30 cm ruler and checking how long it needs to destroy the print.

| | High-gloss (20°) | Middle-gloss (60°) | Dull-gloss (85°) |
|---|---|---|---|
| Uncoated silk paper | 1.6 | 12.2 | 44.8 |
| Paper coated with inventive wax dispersion A (unpolished) | 6.8 | 45.3 | 87.7 |
| Paper coated with inventive wax dispersion A (polished) | 11.9 | 53.0 | 90.7 |
| Paper coated with standard wax dispersion HydroWax 170 from Sasol Wax GmbH (unpolished) | 1.2 | 11.0 | 42.8 |
| Paper coated with standard wax dispersion HydroWax 170 from Sasol Wax GmbH (polished) | 6.9 | 24.2 | 48.1 |
| Paper coated with silicone emulsion Rollosil CXT 9 from Fujifilm Europe NV (not polishable) | 1.6 | 12.3 | 59.9 |

The gloss of the printed and coated paper was determined with a Micro-TRI-gloss analyzer from BYK-Gardner at angles of 20°, 60° and 85° (high-, middle-, dull-gloss) according to DIN 67530. Due to the polishability of the inventive wax coating a much higher high- and middle-gloss can be obtained compared to an unpolished coating or a silicone coating.

HydroWax 170 is a wax dispersion without dialkylether consisting of 64 wt.-% water, 2.0 wt.-% polyvinyl alcohol (hydrolized with 0.5 wt-% KOH) and 0.5 wt.-% anionic naphthalene sulfonate surfactant and 33 wt.-% of a wax phase (28 wt.-% hydrocarbon wax with a congealing point of 63 to 65° C., 3.3 wt.-% Carnauba wax and 1.7 wt.-% aliphatic hydrocarbon resin Escorez 1102 F from Exxon Mobile).

The wax dispersion according to the invention is compatible with other dispersions and emulsions of non-ionic and/or cationic type, which are usually used as over print varnish, and can be used interchangeably with them. That means no cleaning is needed before or after using the wax dispersion according to the invention if another dispersion or emulsion has been used or is to be used respectively. That also allows mixing of the inventive wax dispersion with silicone emulsions if applicable or needed.

The invention claimed is:

1. A wax dispersion, which is an oil-in-water dispersion, comprising
   a) a dispersed phase comprising:
      at least one hydrocarbon wax and
      at least one dialkylether; wherein the weight ratio of the hydrocarbon wax to the dialkylether is 2:1 to 4:1, wherein the dialkylether has formula $R^1$—O—$R^2$ and wherein $R^1$ and $R^2$ are independently of each other aliphatic or cycloaliphatic hydrocarbon residues, with 6 to 10 carbon atoms;
   b) a continuous phase comprising more than 50 wt. % of water relative to the total weight of the wax dispersion; and
   c) at least one surfactant.

2. The wax dispersion according to claim 1, further characterized by one or more of the following features:
   in that the wax dispersion comprises 5 to 30 wt. % of the hydrocarbon wax;
   in that the wax dispersion comprises 1 to 10 wt. % of the dilakylether;
   in that the wax dispersion comprises 50 to 95 wt. % water;
   in that the wax dispersion comprises 2 to 10 wt. % of the surfactant;
all weight ratios are relative to the total weight of the wax dispersion.

3. The wax dispersion according to claim 1, wherein independent of each other
   a) the weight ratio of the hydrocarbon wax to the dialkylether is 2.8:1 to 3.4:1;
   b) the hydrocarbon wax and the dialkylether together comprise 10 to 50 wt. % of the total weight of the wax dispersion.

4. The wax dispersion according to claim 1, wherein the hydrocarbon wax is selected from one or more members of the group consisting of petroleum based paraffin wax, synthetic Fischer-Tropsch wax, polyolefin wax and combinations thereof.

5. The wax dispersion according to claim 1, wherein the hydrocarbon wax has a congealing point according to DIN ISO 2207 of 40 to 110° C.

6. The wax dispersion according to claim 1, wherein the dispersed phase comprises solid particle at 23° C.

7. The wax dispersion according to claim 1, wherein the surfactant is at least one non-ionic surfactant or at least one cationic surfactant or both.

8. The wax dispersion according to claim 7, wherein the non-ionic surfactant is an alcohol ethoxylate or propoxylate or both.

9. The wax dispersion according to claim 7 comprising 1 to 3 wt. % of the cationic surfactant.

10. The wax dispersion according to claim 7, wherein the cationic surfactant is at least one protonated N-alkyl-diamine or quaternary ammonium compound.

11. The wax dispersion according to claim 7, wherein the non-ionic surfactant is an oxo-alcohol ethoxylate.

12. The wax dispersion according to claim 1 having a pH-value of 6 to 9, measured at 25° C.

13. The wax dispersion according to claim 1, wherein the wax dispersion has a surface tension of 30 to 40 mN·m$^{-1}$.

14. The wax dispersion according to claim 1, wherein the wax dispersion comprises particles and the particles have an average particle size $d_{90}$ (number average) of below 300 μm.

15. A diluted wax dispersion, wherein the wax dispersion according to claim 1 is diluted with water in a weight ratio of 1:1 to 1:5.

16. A method of coating paper comprising applying a wax dispersion, which is an oil-in-water dispersion, comprising
   a) a dispersed phase comprising:
      at least one hydrocarbon wax and
      at least one dialkylether; wherein the weight ratio of the hydrocarbon wax to the dialkylether is 2:1 to 4:1, wherein the dialkylether has formula $R^1$—O—$R^2$ and wherein $R^1$ and $R^2$ are independently of each other aliphatic or cycloaliphatic hydrocarbon residues, with 6 to 10 carbon atoms;
   b) a continuous phase comprising more than 50 wt. % of water relative to the total weight of the wax dispersion; and
   c) at least one surfactant;
to a surface of a paper product, wherein the surface of the paper product is a printed paper product surface, optionally further comprising after the step of applying the wax dispersion a drying or polishing step or both.

17. A printed paper product having a coating,
   a) the coating being obtainable by the method according to claim 16; or
   b) the coating comprising the at least one hydrocarbon wax and the at least one dialkylether, wherein the weight ratio of the hydrocarbon wax to the dialkylether being 2:1 to 4:1; and
wherein the dialkylether has formula $R^1$—O—$R^2$ and wherein $R^1$ and $R^2$ are independently of each other aliphatic or cycloaliphatic hydrocarbon residues with 6 to 10 carbon atoms.

18. The method according to claim 16 further characterized by one or more of the following features:
   in that the wax dispersion comprises 5 to 30 wt. % of the hydrocarbon wax;
   in that the wax dispersion comprises 1 to 10 wt. % of the dilakylether;
   in that the wax dispersion comprises 50 to 95 wt. % water;
   in that the wax dispersion comprises 2 to 10 wt. % of the surfactant;
all weight ratios are relative to the total weight of the wax dispersion.

19. The method according to claim 16, wherein the hydrocarbon wax and the dialkylether are applied to the paper product with a coating weight of 0.2 to 1 g·m$^{-2}$, relative to the coated surface of the paper product.

20. A method of coating paper products comprising applying the wax dispersion as claimed in claim 1 to a surface of a paper product, wherein the wax dispersion is diluted with water in a weight ratio of 1:1 to 1:5 prior to coating the surface or alternatively diluting the dispersion until a concentration of the sum of the hydrocarbon wax and the dialkylether of 3.5 to 12 wt. % is obtained and wherein the surface of the paper product is a printed paper product surface, optionally further comprising after the step of applying the wax dispersion a drying or polishing step or both.

* * * * *